M. A. GIBBONS.
HAY BALER.
APPLICATION FILED SEPT. 19, 1912.
1,057,340.
Patented Mar. 25, 1913.
2 SHEETS—SHEET 2.
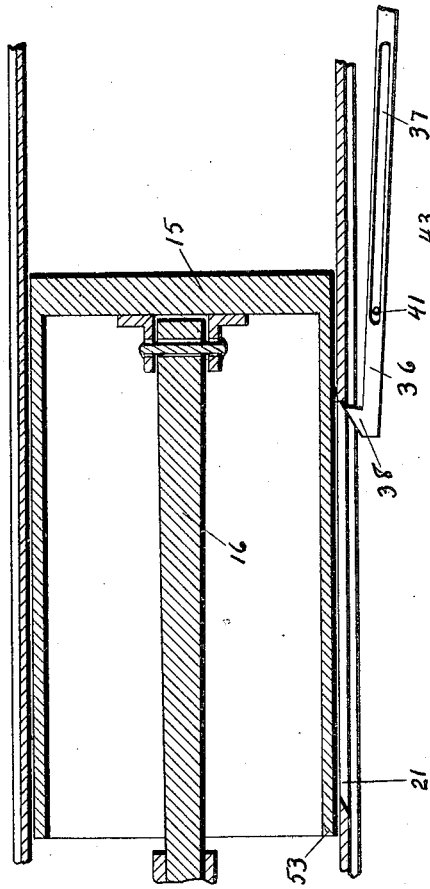
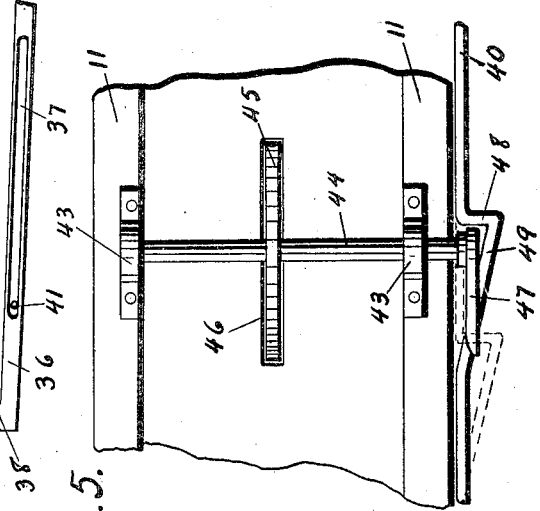
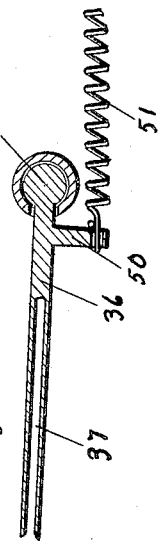
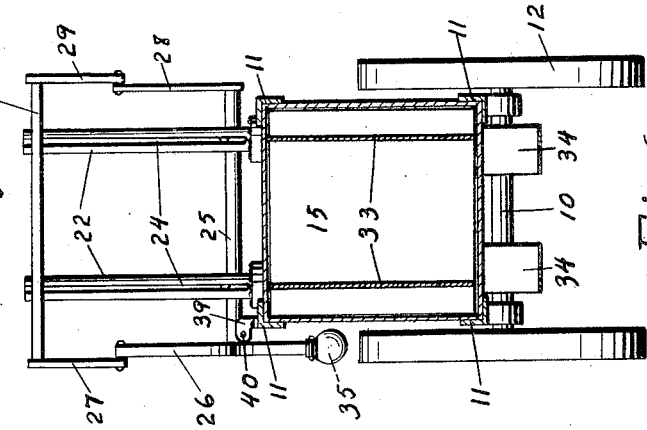
Witnesses.
L. A. Paley.
S. Robinson.
Inventor.
Mary A. Gibbons
By Orwig & Bair Atty's.

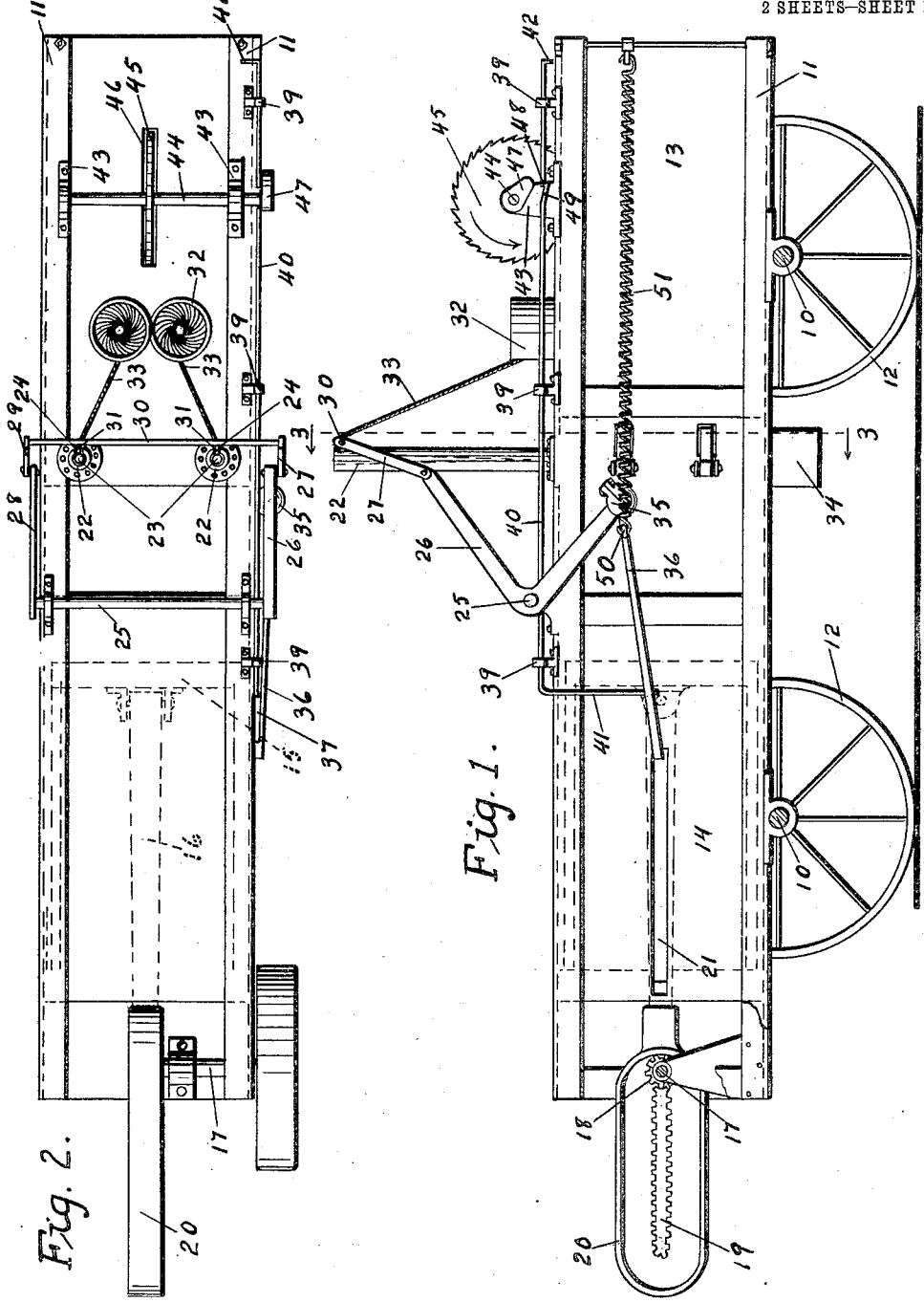

UNITED STATES PATENT OFFICE.

MARY A. GIBBONS, OF WALNUT, IOWA.

HAY-BALER.

1,057,340.

Specification of Letters Patent. Patented Mar. 25, 1913.

Application filed September 19, 1912. Serial No. 721,306.

*To all whom it may concern:*

Be it known that I, MARY A. GIBBONS, a citizen of the United States, residing at Walnut, in the county of Pottawattamie and State of Iowa, have invented a new and useful Hay-Baler, of which the following is a specification.

The object of my invention is to provide a baler of simple and durable construction for baling hay, corn husks or the like.

A further object is to provide a baler having means whereby the operation of the plunger automatically controls the action of the twine carrying needles for operating them at the proper time with relation to the completion of a bale.

More particularly it is my object to provide in a baler simple and effective mechanism whereby the movement of the material in the packing of the bale automatically connects the plunger with the twine carrying needles for causing them to be operated at the proper time.

My invention consists in certain details, in the construction, arrangement and combination of the various parts of the device, whereby the objects contemplated are attained, as hereinafter set forth, pointed out in my claims, and illustrated in the accompanying drawings in which—

Figure 1 shows a side elevation of a baler embodying my invention. Fig. 2 shows a top or plan view of the same. Fig. 3 shows a vertical, transverse, sectional view taken on the line 3—3 of Fig. 1. Fig. 4 shows a horizontal, central, sectional view through the plunger and the guides therefor. Fig. 5 shows a detail view of the notched wheel and part of the mechanism connected therewith. Fig. 6 shows a detail, sectional view of the slotted arm which connects the plunger head.

In the accompanying drawings I have used the reference numeral 10 to indicate the axles which are mounted on the frame 11 and which carry the wheels 12 on which the baler travels. On one end of the machine which I shall call the rear end is the baler box 13, and at the other end is a casing 14 which serves as a guide for a plunger head 15 slidably mounted therein. Pivoted to one surface of the plunger 15 is one end of a plunger arm 16, the other end of which is mounted on the frame of the guide 20 as hereinafter described. On the shaft 17 is a pinion 18. In mesh with the pinion 18 is an approximately elliptical rack bar 19 provided with external teeth, and secured thereto is an approximately elliptical guide 20 for holding the rack bar 19 in mesh with the pinion 18. It will thus be seen that the operation of the shaft 17 from any suitable force of power will cause the rack bar 19 to travel around the gear 18 and will impart reciprocating motion to the plunger 15.

In one side of the casing 14 is a horizontal elongated slot or opening 21, the purpose of which will be hereinafter more fully set forth. Mounted above the front end of the baler box and spaced apart from the sides thereof are vertical cylinders 22 designed to carry the needles 23 which are mounted to slide up and down in said cylinders. Each of the cylinders is provided on one side with a vertical slot 24. Mounted above the rear end of the casing 14 is a rock shaft 25 on one end of which is fixed a bell crank lever 26 one arm of which extends normally rearwardly and upwardly, the other arm of which extends normally rearwardly and downwardly. Pivoted to the end of the upwardly and rearwardly extending arm of the bell crank lever 26 is a link 27. On the other end of the rock shaft 25 is a lever 28 parallel with the upwardly and rearwardly extending arm of the bell crank lever 26, and pivoted to the end of the lever 28 is a link 29.

The links 27 and 29 are pivotably mounted on the ends of a transverse shaft or rod 30 adjacent to the cylinders 24. A short bar 31 connects each of the needles 23 with the rod or shaft 30. The bars 31 extend through the slots 24. The parts just described are so arranged that the rotation of the rock shaft 25 causes vertical movement of the needles 23. On the top of the baler box are twine boxes 32 which are filled with balled twine 33 which is extended to and threaded through the needles 23. Below the front end of the baler box are knotting devices 34 which may be of any desired construction and therefore not described in detail.

Connected with the end of the downwardly and rearwardly extending arm of the bell crank lever 26 by means of a ball and socket joint 35 is a slotted arm 36 extending upwardly along the side of the baler and provided with an elongated vertical slot 37. On the front end of the arm 36 is a hooked catch member 38 which extends into the slot 21 in the side of the casing 14 as shown in Fig. 4. Mounted on the top of the baler near one side thereof are a plurality of bearings 39 which extend slightly beyond the side of the baler. Rotatably and slidably mounted in the bearings 39 is a shaft 40 extending from a point near the rear end of the baler box to a point beyond the front end thereof. At its front end the shaft 40 is provided with a downward extension 41 which is received in the slot 37 of the arm 36. The shaft 40 and the extension 41 are so constructed and arranged that by a slight rotation of said shaft the arm 36 may be moved inwardly and outwardly to cause the hooked member 38 to be received entirely within the casing 14 or to be outside of said casing.

On the rear end of the shaft 39 is a lateral extension 42 designed to engage the top of the baler box and to limit the rotary movement of the shaft 40, and to thereby limit the outward movement of the extension 41 and the arm 36. Mounted on the top of the baler box are bearings 43 in which is rotatably mounted a transverse shaft 44 in the middle of which is fixed a tooth wheel 45 which is of such size that it extends downwardly through a slot 46 into the baler box to a point where it will be engaged and rotated by material packed into the baler box by the plunger 15. The shaft 44 is preferably located above the level of the shaft 40. On one end of the shaft 44 is a laterally extending arm 47. At one point in its length a portion of the rod or rock shaft 40 is bent at right angles to the main portion of said rod 40 and is then inclined toward the main portion of said body 40, the inclined part being indicated by the numeral 49. The inclined portion 49 is designed to co-act with the arm 47 in the manner hereindescribed.

Formed on the slotted arm 36 is an outwardly extending arm 50 at the outer end of which is secured a contractible coil spring 51 which extends rearwardly along the baler box and is secured thereto.

The rear end of the baler box is provided with an end or door not shown which may be secured and released in any suitable manner for holding the bale in position and for discharging the same.

It is noted in this connection that my improved baler may be used in connection with my corn husking machine as shown in my patent thereon No. 1,017,625, issued February 13, 1912.

In the practical operation of my improved baler, the twine is threaded through the needles and to the knotter. Motion is transmitted to the shaft 17 in any suitable manner. It will readily be seen that the plunger will be operated by means of the plunger arm and the rack bar 19 and the frame 20. The material is dropped into the machine from the top and is packed by the plunger 15 into the baler box.

The parts heretofore described are so arranged with relation to each other that their operation is as follows: Assuming the tooth wheel 45 to be in position shown in Fig. 1, the movement of the material to be baled rearwardly in the baler box will rotate the wheel 45 slightly with each movement of the plunger head. It requires several movements of the plunger head to turn the wheel 45 a complete revolution. The portion 49 stands in a horizontal plane and is engaged by said arm 47 as the shaft 44 is rotated by the wheel 45. The portion 49 is thereby forced downwardly thereby slightly rotating the shaft 40 moving the downward extension 41 inwardly and causing the hooked member 38 to extend into the casing 14 through the slot 21. When the plunger is at the rearward position of its movement the hooked member 38 extends past the forward end of the plunger indicated by the reference numeral 53, and on the return of the plunger is engaged thereby. The arm 36 is drawn toward the front of the baler thereby moving the bell crank lever 26 and forcing the needles downwardly to the knotting device. The length of the slot 37 is such that when the arm 36 is drawn to the forward position of its movement, the rear portion of the slot engages the extension 41 and slides the rod 40 forwardly past the arm 47. When the plunger starts again on its rearward movement, the spring 50 draws the arm 36 rearwardly and also swings it slightly outwardly. By its outward movement, the arm 36 acting through the downward extension 41 slightly rotates the rod 40 until the portion 49 and the portion 48 once more rest in a horizontal plane. As the rod 40 moves rearwardly, the portion 48 engages the arm 47 and slightly rotates the wheel 45 so that the arm 47 will not engage the portion 49 until after almost another revolution of the wheel 45. The advantages of my mechanism for operating the needles are largely seen from the foregoing description. The amount of material packed in the baler box determines the degree of rotation of the wheel 45 and on that account, the needles are operated at the proper time when the bale is completed.

I claim as my invention:

1. In a device of the class described, the combination of a frame including a baler box with a plunger arranged to pack material in said baler box, means for imparting reciprocating motion to said plunger, needles slidably mounted on said frame, a bell crank lever having one end operatively connected with said needles, a rod connected by a universal joint with the other end of said bell crank lever, said rod being provided with an elongated vertical slot, an outwardly extending arm on said rod, means for exerting yielding pressure for drawing said last named arm rearwardly, a hook on the forward end of said rod, a shaft slidably and rotatably mounted on said frame provided with a right angled extension the end of which is received within the slot in said rod, a transverse shaft mounted above the baler box, a toothed wheel fixed thereon designed to be moved by material packed into said box and extending downwardly into the baler box, an arm on said transverse shaft adjacent to said first mentioned shaft, said first mentioned shaft being formed with a portion inclined rearwardly and outwardly from the main body of said shaft and then to the main body of said shaft at right angles thereto and designed to be engaged by the arm on said transverse shaft when the latter is rotated to a certain position by the toothed wheel.

2. In a device of the class described, a frame, a transverse shaft rotatably mounted thereon, an arm extending at right angles from said shaft, a shaft rotatably and slidably mounted on said frame at right angles to said first shaft, said second shaft having a portion inclined at an acute angle to the main body thereof and designed to be engaged by said arm in certain positions to the rotation of said transverse shaft, and a portion extending from the outer end of said inclined portion inwardly to said main body.

3. In a device of the class described, a frame, a transverse shaft rotatably mounted thereon, an arm extending at right angles from said shaft, a second shaft rotatably and slidably mounted on said frame at right angles to said first shaft, having a portion inclined at an acute angle to its main body, designed to be engaged by said arm and a portion extending from the outer end of said inclined portion to the main body of said second shaft at right angles thereto, a bell crank lever centrally pivoted on said frame, needles slidably mounted on said frame, one end of said bell crank lever being operatively connected with said needles, an arm connected with the other end of said bell crank lever by a universal joint, said arm being provided with an elongated slot, said first named shaft having formed thereon a right angled extension received in said slot.

4. In a device of the class described, a box, a transverse shaft rotatably mounted thereon, an arm extending at right angles from said shaft, a second shaft rotatably and slidably mounted on said box at right angles to said first shaft having a portion inclined at an acute angle to the main body of said second shaft, designed to be engaged by said arm and having a portion extending from the outer end of said inclined portion to said main body at right angles thereto, a bell crank lever centrally pivoted on said box, needles slidably mounted on said box, one end of said bell crank lever being operatively connected with said needles, an arm connected with the other end of said bell crank lever by a universal joint, said arm being provided with an elongated slot, said first named shaft having formed thereon a right angled extension received in said slot, an outwardly extending arm formed on said slotted arm, and a contractible spring secured to said box, and to the end of said outwardly extending arm.

5. In a device of the class described, the combination of a frame including a baler box and a casing designed to serve as a guide for a plunger head, said casing being provided with a longitudinal slot in one side, a plunger, means for imparting reciprocating motion thereto, a transverse shaft, a toothed wheel thereon extending into said baler box and designed to be moved by material in said box, an arm extending at right angles from said shaft, a second shaft slidably and rotatably mounted on said frame at right angles to said transverse shaft provided with an inclined portion adjacent to the arm on said transverse shaft, said portion being designed to be engaged by the arm on said transverse shaft when the latter is rotated to certain position by the toothed wheel, and with a portion extending from said inclined portion to the main body of said second shaft at right angles thereto, a right angled extension formed on said second shaft, a rock shaft, a bell crank lever fixed on one end thereof, an arm connected by a universal joint with one end of said bell crank lever, said arm being provided with an elongated slot in which the extension on said second shaft is received, and with a hook member extending into the slot in said casing, needles operatively connected with the other end of said bell crank lever, said parts being so arranged that when said transverse shaft is rotated the arm thereon will engage the inclined portion of said second shaft and the extension on said second shaft will move said slotted arm inwardly until said hook member is engaged by said plunger in its forward movement.

6. In a device of the class described, the combination of a frame including a baler box and a casing designed to serve as a guide for a plunger head, said casing being provided with a longitudinal slot in one side, a plunger, means for imparting reciprocating motion thereto, a transverse shaft, a toothed wheel thereon extending into said baler box, an arm extending at right angles from said shaft, a second shaft slidably and rotatably mounted on said frame, at right angles to said transverse shaft provided with an inclined portion adjacent to the arm on said transverse shaft and designed to be engaged by same and with a portion extending from said inclined portion to the main body of said second shaft at right angles thereto, a right angled extension formed on said second shaft, a rock shaft, a bell crank lever fixed on one end thereof, an arm connected by a universal joint with one end of said bell crank lever, said arm being provided with an elongated slot in which the extension on said second shaft is received, and with a hook member extending into the slot in said casing, needles operatively connected with the upper end of said bell crank lever, said parts being so arranged that when said transverse shaft is rotated the arm thereon will engage the inclined portion of said second shaft and the extension on said second shaft will move said slotted arm inwardly until said hook member is engaged by said plunger in its forward movement, said slot being of such length that when the slotted arm is moved to the forward position of its movement, the second shaft is moved longitudinally until the inclined portion thereof passes the arm on said first shaft.

7. In a device of the class described, the combination of a frame including a baler box and a casing designed to serve as a guide for a plunger head, said casing being provided with a longitudinal slot in one side, a plunger, means for imparting reciprocating motion thereto, a transverse shaft, a toothed wheel thereon extending into said baler box, an arm extending at right angles from said shaft, a second shaft slidably and rotatably mounted on said frame at right angles to said transverse shaft provided with an inclined portion adjacent to the arm on said transverse shaft, designed to be engaged by same, and with a portion extending from said inclined portion to the main body of said second shaft at right angles thereto, a right angled extension formed on said second shaft, a rock shaft, a bell crank lever fixed on one end thereof, an arm connected by a universal joint with one end of said bell crank lever, said arm being provided with an elongated slot in which the extension on said second shaft is received, and with a hook member extending into the slot in said casing, needles operatively connected with the upper end of said bell crank lever, said parts being so arranged that when said transverse shaft is rotated the arm thereon will engage the inclined portion of said second shaft and the extension on said second shaft will move said slotted arm inwardly until said hook member is engaged by said plunger in its forward movement, said slot being of such length that when the slotted arm is moved to the forward position of its movement, the second shaft is moved longitudinally until the inclined portion thereof passes the arm on said shaft, an outwardly extending arm on said slotted arm and a contractible coil spring secured thereto and to said baler box.

MARY A. GIBBONS.

Witnesses:
  O. M. BRUCE,
  W. F. BURKE.

---

Copies of this patent may be obtained for five cents each, by addressing the "Commissioner of Patents, Washington, D. C."